(No Model.) 2 Sheets—Sheet 1.
J. M. NORMAND.
JOURNAL BOX.
No. 383,410. Patented May 22, 1888.
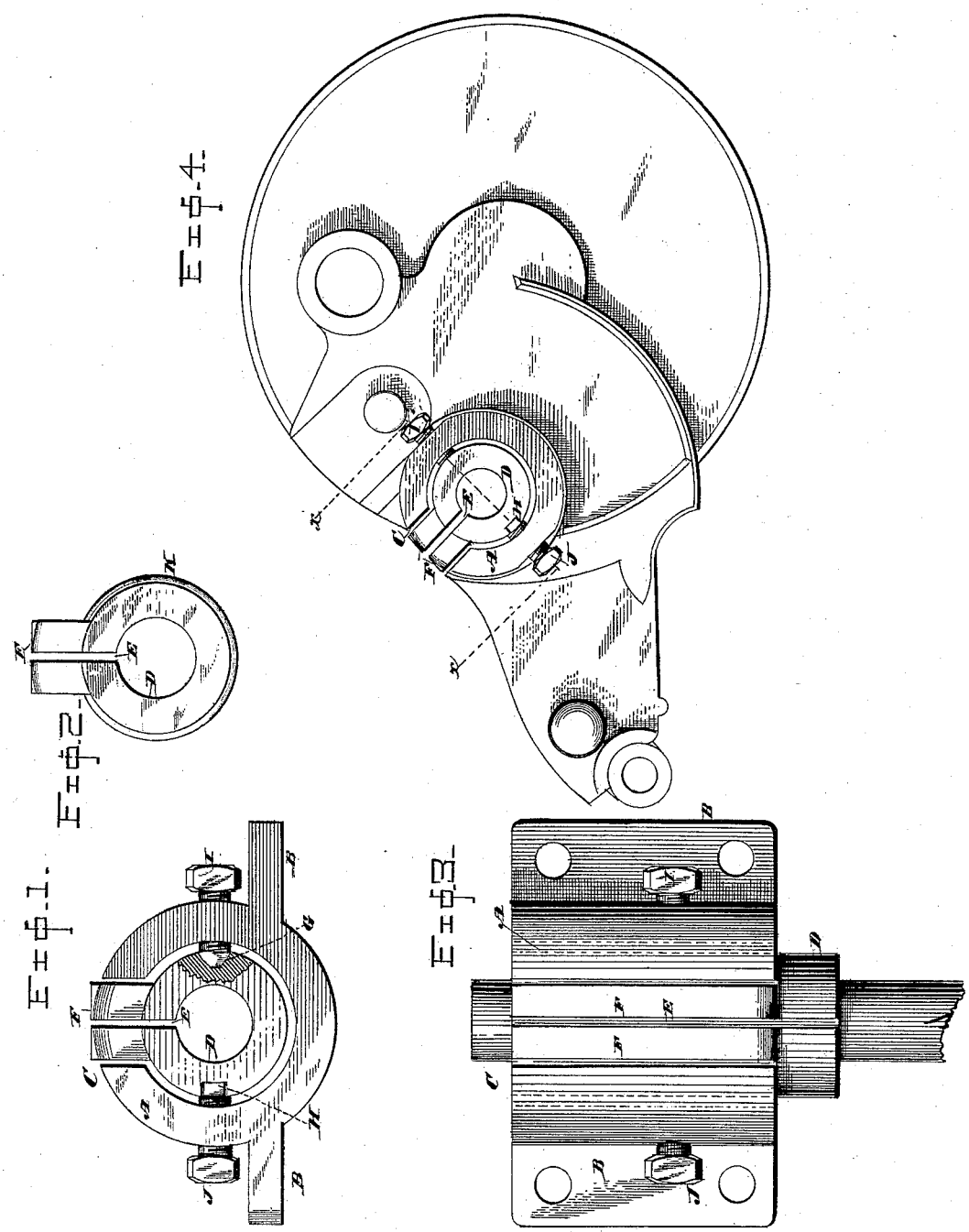
WITNESSES
INVENTOR,
Joseph M. Normand,
By H. A. Toulmin,
his Attorney.

(No Model.) 2 Sheets—Sheet 2.
J. M. NORMAND.
JOURNAL BOX.
No. 383,410. Patented May 22, 1888.
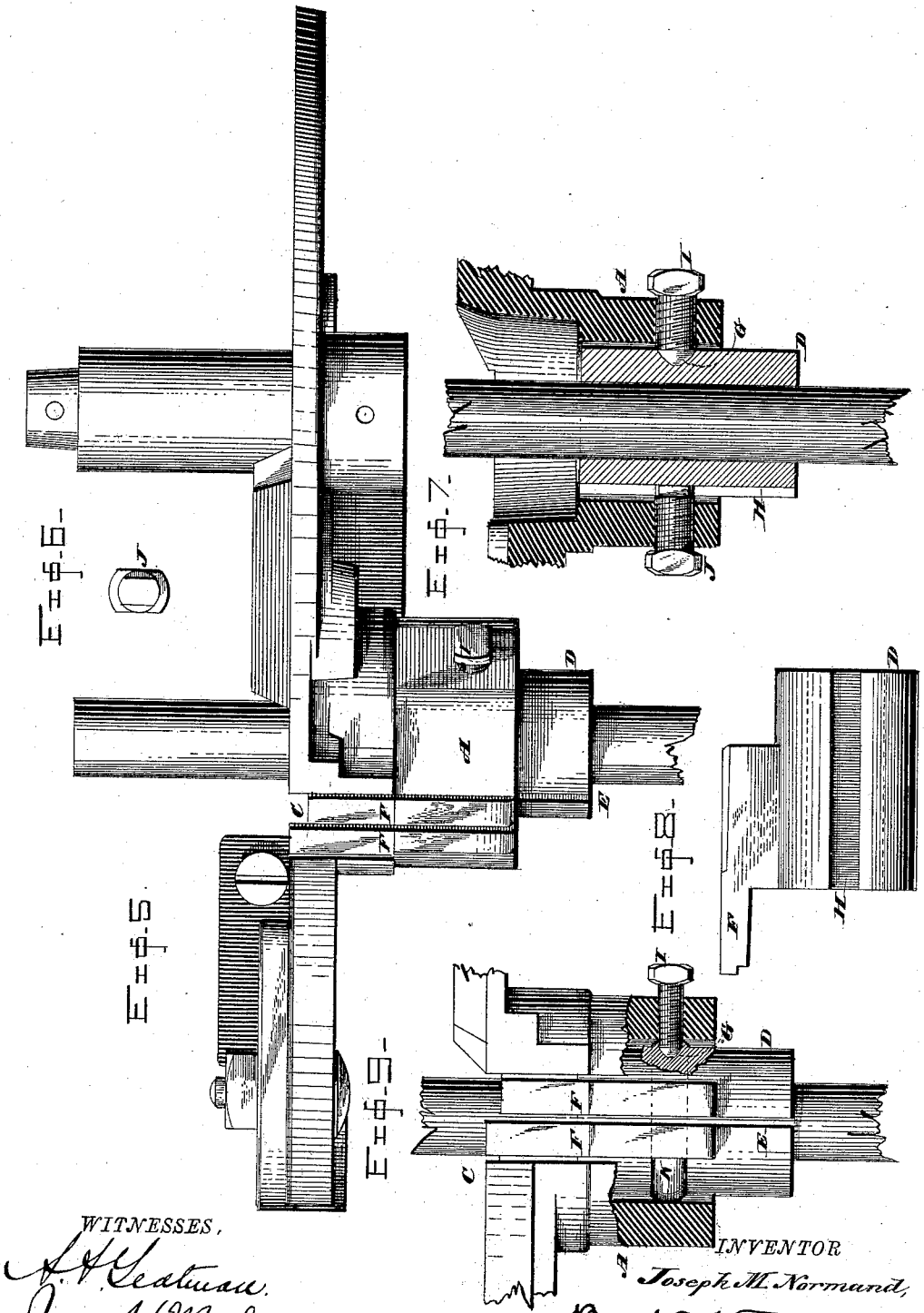
WITNESSES.
INVENTOR
Joseph M. Normand,
By his Attorney.

United States Patent Office.

JOSEPH M. NORMAND, OF SPRINGFIELD, OHIO, ASSIGNOR OF ONE-HALF TO THE THOMAS MANUFACTURING COMPANY, OF SAME PLACE.

JOURNAL-BOX.

SPECIFICATION forming part of Letters Patent No. 383,410, dated May 22, 1888.

Application filed September 30, 1887. Serial No. 251,104. (No model.)

*To all whom it may concern:*

Be it known that I, JOSEPH M. NORMAND, a citizen of the United States, residing at Springfield, in the county of Clark and State of Ohio, have invented certain new and useful Improvements in Journal-Boxes, of which the following is a specification, reference being had therein to the accompanying drawings.

This invention relates to certain new and useful improvements in journal-boxes for shafts.

The invention consists, essentially, of a sleeve whose interior forms a shaft-bearing, of a suitable box in which it is located, and of screws or other suitable supports upon which it is mounted, and on which it is arranged to have a slight universal movement to adjust itself to the direction of the shaft to permit the free and easy rotation thereof, even should the shaft be not perfectly straight, or should one bearing thereof be out of true alignment with the other bearing.

The invention further consists of said box when provided with an opening in the wall thereof, through which a shaft can be introduced into and removed from the box in said sleeve, and screws or other supports which sustain it within the box, and which are arranged to allow the sleeve to be withdrawn from within the box and to be introduced into it so as to slip off and on the shaft, as will be hereinafter more fully explained.

The invention still further consists of the said sleeve when provided with an incision through the wall thereof to allow it to be compressed, of a box for the sleeve, and of the screws or other supports which sustain it, and by one or both of which it can be compressed to take up the wear occurring between its interior and the shaft-journal.

In the accompanying drawings, forming a part of this specification, and on which like reference-letters indicate corresponding parts, Figure 1 represents a side elevation of my improved journal-box; Fig. 2, a similar view of the sleeve detached, showing a modified form of the structure of the exterior thereof; Fig. 3, a plan view of the device as shown in Fig. 1; Fig. 4, a side elevation of the device, showing its application to the side plate of a hand lawn-mower; Fig. 5, a plan view of the parts shown in Fig. 4; Fig. 6, a detail view of one of the screws; Fig. 7, a sectional view in detail on the line *x x* of Fig. 4; Fig. 8, a detail view of the bearing-sleeve, and Fig. 9 a detail view, partly in section and partly in plan, of a modified form of the journal-box as applied to a lawn-mower.

While my invention is applicable and useful in various machines and places where shafts are used, I have also illustrated it as applied to one of these uses—namely, to a hand lawn-mower.

The letter A designates the box proper, which may be constructed with suitable supporting-lugs, B, when designed for ordinary purposes, or which may be otherwise fashioned to suit the particular purpose for which it is to be used—as, for instance, it may form a part of the side plate of a lawn-mower, as represented in Figs. 4, 5, 7, and 9. This box is preferably provided with an opening, as at C, for the purpose of introducing a shaft into it, or of removing the shaft therefrom without disturbing the box in instances where they are permanently secured and is not convenient either to remove them and slip them over the shaft, or where it is not convenient to slip the shaft into them, as in the case of a lawn-mower where the side plates are secured a fixed distance apart, and the reel-shaft is provided with a reel precluding its being slipped through one box and on into the other.

The letter D refers to the bearing-sleeve, constructed of any suitable metal for the purpose in view, and consisting of a cylindrical body having an incision, as at E, in the wall thereof, for the purpose of allowing it to be more or less compressed, so as to adjust the diameter of its bore snugly to the shaft-bearing, and so as to take up the wear occurring between them. By preference, it is further provided with the ribs F, which serve to virtually close the opening C in the box. This sleeve also has at one side a recess, as at G, to accommodate the end of one of the screws, and at the other side a channel, H, to receive the other screw. These consist of screws I and J, which have a bearing in the box A, and which respectively enter the recess G and the channel H. Thus the sleeve is mounted within the box A, with a slight space between it and the interior of the box, for the purpose of allowing the sleeve to adjust its position to the peculiarities, the position, direction, &c., of the shaft. The movement of the sleeve may be in any direction, and is properly expressed by the term "universal"—that is to say, it has universal adjustability within the box. The channel H allows the sleeve a sufficient movement on the screw J when the sleeve is undergoing adjustment. The device J need not necessarily be a screw, but may be a fixed point, as the channel allows the sleeve to be slipped in and out. By adjusting one or both of the screws toward each other the sleeve is compressed for the purpose already mentioned. In some instances I may omit one of the screws—J, for instance—and provide the exterior of the sleeve with a bead, K. (Shown in Figs. 2 and 9.) In the latter figure it will be noticed that the bead rests against the interior of the box A, while the screw I enters the recess G in the opposite side thereof. This merely shows a modification. The same functions are performed, however, by this form as by the other form shown and described. In either case the sleeve has the universality of movement or adjustment. In either case it can be compressed, and in either case it can be withdrawn from the box by slipping it to one side or the other.

Having thus fully described my invention, what I claim as new, and desire to secure by Letters Patent, is—

1. In a journal-box, the combination, with the box proper, of a compressible bearing-sleeve fitted therein and supports therefor, and on which it is universally adjustable, one at least of said supports being inwardly adjustable so as to compress said sleeve.

2. In a journal box, the combination, with the box proper and supports projecting into the interior thereof, one at least of which is inwardly adjustable, of a bearing sleeve having an exterior recess and a channel with which the respective supports engage, and an incision through the wall thereof, whereby it is compressible.

3. In a journal-box, the combination, with the box proper having a radial slot or opening in a fixed wall thereof whose width is greater than the diameter of the shaft to be used in said box, whereby the shaft may be introduced and removed from the box sidewise to its axis, and supports projecting through the wall of said box and into the interior thereof, of a bearing-sleeve of less diameter than the interior of said box, mounted therein upon said supports and universally adjustable on them, and arranged to be introduced into and removed from said box at either side in a longitudinal direction, so as to slip over and off the shaft already within the box, for the purpose set forth.

4. In a journal-box, a compressible bearing-sleeve composed of a cylindrical body, through the wall of which an incision is made, and having a recess in the outside of the wall to one side of the incision, and a longitudinal channel in the outside of the wall at a point diametrical to the recess.

In testimony whereof I affix my signature in presence of two witnesses.

JOSEPH M. NORMAND.

Witnesses:
WILBER COLVIN,
A. A. YEATMAN.